United States Patent
Hong et al.

(10) Patent No.: US 6,705,557 B2
(45) Date of Patent: Mar. 16, 2004

(54) IDLER DEVICE FOR MAGNETIC RECORDING/REPRODUCING APPARATUS

(75) Inventors: Sung Pyo Hong, Suwon (KR); Ji Young Lee, Pyeongtaeg (KR); You Seok Chae, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/006,570

(22) Filed: Dec. 10, 2001

(65) Prior Publication Data

US 2002/0070304 A1 Jun. 13, 2002

(30) Foreign Application Priority Data

Dec. 11, 2000 (KR) .......................... 2000-75322
Dec. 11, 2000 (KR) .......................... 2000-75328

(51) Int. Cl.[7] ............................................. G11B 15/32
(52) U.S. Cl. ..................................................... 242/356
(58) Field of Search ............................... 242/356, 356.3; 360/96.3

(56) References Cited

U.S. PATENT DOCUMENTS

| | | | | |
|---|---|---|---|---|
| 3,613,857 A | * | 10/1971 | Thevis et al. | 400/217.1 |
| 4,330,098 A | * | 5/1982 | Santoro | 242/356 |
| 4,956,732 A | * | 9/1990 | Moriyama | 360/96.3 |
| 5,067,034 A | * | 11/1991 | Kido | 360/74.1 |
| 5,499,777 A | * | 3/1996 | Ahn | 242/356 |
| 5,668,681 A | * | 9/1997 | Umezawa | 360/96.4 |
| 5,669,567 A | * | 9/1997 | Chiu | 242/355 |
| 5,915,677 A | * | 6/1999 | Yajima et al. | 267/161 |
| 5,999,358 A | * | 12/1999 | Koguchi et al. | 360/74.1 |
| 6,170,774 B1 | * | 1/2001 | Akashi et al. | 242/356.6 |
| 6,254,024 B1 | * | 7/2001 | Shimbo | 242/349 |

* cited by examiner

*Primary Examiner*—Kathy Matecki
*Assistant Examiner*—Scott J. Haugland
(74) *Attorney, Agent, or Firm*—Birch, Stewart, Kolasch & Birch, LLP

(57) ABSTRACT

An idler device of the magnetic recording/reproducing apparatus is disclosed having the construction that an idler arm is inserted to the side of a clutch shaft which is installed at a lower surface of a main chassis. Without an extra construction for the assembly, a snap engagement is possibly made, so that a workability of an assembly working is improved and the number of parts can be reduced, and thus, a production cost can be reduced. In addition, the assembly of an idler gear is completed as a plate spring is fixed to an idler shaft in a state that the idler gear is inserted in the idler shaft of an idler arm. Thus, the assembly working is relatively facilitated, and a production cost can be reduced with the simple construction. Moreover, since the plate spring is installed in a state of being fixed at the protrusion bar by the stopper, the relative position of the plate spring is precisely set with respect to the neighboring parts, so that an operation reliability can be remarkably improved.

19 Claims, 4 Drawing Sheets

IDLER DEVICE FOR MAGNETIC RECORDING/REPRODUCING APPARATUS

BACKGROUND OF THE INVENTION

1. Field of the Invention

The present invention relates to a magnetic recording/reproducing apparatus, and more particularly, to an idler device of a magnetic recording/reproducing apparatus in which an idler gear is selectively rotated to be in contact with a supply reel according to a rotational direction of an idler gear.

2. Description of the Background Art

FIG. 1 illustrates a tape travelling structure of a general magnetic recording/reproducing apparatus.

As shown in FIG. 1, a supply reel driving body 1 and a winding reel driving body 21 are installed to drive a supply reel (not shown) and a winding reel (not shown) of a tape cassette (not shown) at one side of a main chassis.

A plurality of posts and guide rollers are installed on the main chassis (C) to guide travelling of a tape (T) released from a tape cassette.

A tension post 3 for controlling a tensile force of a travelling tape (T) is installed at a tension arm 4.

The tension arm 4 is rotated at a predetermined angle according to the tension of the tape (T) on the main chassis (C) centering around a shaft pin 2, for which the tension arm 4 is elastically supported by a spring 5.

The tape (T) having passed the tension post 3 is guided by a guide post 6 and transmitted to a full width erasing head 7.

The full width erasing head 7 removes in advance a signal which has been recorded on the tape in a recording mode.

An inertia roller is installed at a position past the full width erasing head 7 to guide the travelling of the tape (T).

Next, the tape (T) is guided by guide posts 10 and 11 of the supplying and winding side which are moved along loading paths formed at both sides of a rotational head drum 9.

The guide posts 10 and 11 draws the tape (T) from the inside of the tape cassette, the position indicated in a dotted line as shown in FIG. 1, so as to be wound and traveled.

A supply slant post 12 and a winding slant post 13 are provided next to the guide posts 10 and 11 toward the rotational head drum 9, so as to guide the traveling of the tape (T).

The guide posts 10 and 11 and the slant posts 12 and 13 are installed on a supply and winding slant bases 14 and 15 and moved along the loading path.

As shown in FIG. 1, the rotational head drum 9, on which the tape (T) is wound and traveled, is provided with a rotational head (not shown) for reading a signal recorded on the tape (T) or recording a signal.

The tape (T) passes the rotational head drum 9 and the slant post 13 and the guide post 11 of the winding side and then passes the audio control head 16. The audio control head 16 performs deleting, recording and reproducing of an audio signal, and recording and reproducing a control signal.

A guide post 17 is provided on the main chassis (C) at an adjacent location of the audio control head 16 to control the traveling height of the tape (T).

A capstan shaft 18 for providing a traveling force to the tape (T) is installed at a position passing the guide post 17.

The capstan shaft 18 is an output shaft of a capstan motor (not shown) installed at the opposite face of the main chassis (C), and a traveling direction of the tape (T) is determined depending on the rotational direction of the capstan motor.

A pinch roller 19 is installed selectively tightly-attached to the capstan shaft 18 to provide a force for pulling the tape (T).

A winding post 20 is provided at an adjacent location of the pinch roller 19 and the capstan shaft 18. A winding arm (not shown) is installed and moved at the winding post 20.

Between the supply reel driving body 1 and the winding reel driving body 21, a clutch assembly 22 is installed to drive the supply reel or the winding reel at a certain torque regardless of the amount of the tape (T) wound on the supply reel or the winding reel upon receipt of a driving force from the capstan motor.

An idler gear 24 is installed at a front end of an idler arm 25 which is coaxially installed with the clutch assembly 22. The idler gear 24 is selectively connected to either the supply reel driving body 1 or the winding reel driving body 21 for transferring a driving force thereto upon receipt of a driving force from the clutch assembly 22.

A tension brake 27 is installed wound on the supply reel driving body 1 with its both ends fixed at the tension arm 4. The tension brake 27 controls the rotational speed of the supply reel driving body 1 according to the operation of the tension arm 4, thereby controlling a tension of the tape (T).

The construction of the idler unit including the idler arm 25 and the idler gear 24 will now be described with reference to FIG. 2.

First, the idler arm 25 is installed centering around the clutch shaft 22' installed penetrating the main chassis (C) The idler arm 25 is positioned at an upper surface of the main chassis (C) and the clutch assembly 22 is installed at the lower surface of the main chassis (C). The clutch shaft 22', the center of the rotation of the clutch assembly 22, is installed penetrating from the lower surface to the upper surface of the main chassis (C) and fixed as a washer 25w is inserted at the end portion of the clutch shaft 22'.

The idler gear 24 is installed at the front end portion of the idler arm 25, so as to be rotatable centering around an idler shaft 24p.

An idler spring 25s is installed between the idler arm 25 and the idler gear 24. The idler spring 24s supported by the idler gear 24 is mounted on a friction member 24f installed at the idler gear 24.

The idler spring 24s is operated so that the idler arm 25 can be rotated centering around the clutch shaft 22' according to the rotational direction of the idler gear 24.

That is, according to the rotational direction of the idler gear 24, the idler gear 24 is selectively engaged with the supply reel driving body 1 or the winding reel driving body 21 to transfer the driving force of the capstan motor.

Reference numerals 24g denotes a large gear and 24g' denotes a small gear.

However, the idler unit of the conventional art has many problems.

That is, first, in installing the idler arm 25 at the upper surface of the main chassis (C), it is to be assembled together with the clutch assembly 22.

Namely, in a state that the clutch assembly 22 is positioned at the lower surface of the main chassis (C) and the idler arm 25 is positioned at the upper surface of the main chassis (C), the washer 25w is to be engaged at the end portion of the clutch shaft 22'. Thus, the assembly working is relatively complicated.

Secondly, for the installation of the idler arm 25, the washer 25w is necessarily used, creating a problem that the parts for the assembly are relatively increased in number, which results in that a production cost is accordingly increased and the number of assembly working is relatively increased.

Thirdly, in stalling the idler gear 24 at the idler arm 25, the idler shaft 24p is to be installed after positioning the idler spring 24s in a state of a provisional assembly between the idler arm 25 and the idler gear 24. Thus, the assembly operation is relatively complicated.

Fourthly, in the assembly process, if the idler spring 24s allowing an elastic force for the idler gear 24 which is rotated between the friction member 24f and the idler arm 25 is not installed at the right position, the idler gear 24 is not properly operated.

Lastly, since the number of parts for operation of the idler gear 24 is relatively many, its production cost is increased and the process number of the assembly working is relatively increased.

SUMMARY OF THE INVENTION

Therefore, an object of the present invention is to provide an idler device for a magnetic recording/reproducing apparatus that is capable of minimizing the number of parts and facilitating an assembly working.

Another object of the present invention is to provide an idler device for a magnetic recording/reproducing apparatus that is capable of heightening a reliability in an idle operation.

To achieve these and other advantages and in accordance with the purpose of the present invention, as embodied and broadly described herein, there is provided an idler device for a magnetic recording/reproducing apparatus including a clutch shaft vertically coupled to a main chassis; an idler arm installed rotatable centering around the clutch shaft by having an mounting portion elastically engaged to the clutch shaft in a snap method in the direction of the side of the clutch shaft at one portion; an idler shaft provided at the other portion of the idler arm; an idler gear rotatably installed at the idler arm centering around the idler shaft, for selectively transmitting a driving force according to a rotational direction; and a pressing elastic member supported by an end portion of the idler shaft, for elastically pressing the idler gear in the direction of the idler arm.

In the idler device for a magnetic recording/reproducing apparatus of the present invention, the clutch shaft is provided with a supporting portion at its side and the mounting portion of the idler arm is supported by being coupled between the main chassis and the supporting portion of the clutch shaft.

In the idler device for a magnetic recording/reproducing apparatus of the present invention, a protrusion bar is formed at the end portion of the idler shaft to support the pressing elastic member, and the pressing elastic member is supported by the protrusion bar and made of a disk-shaped plate spring providing an elastic force to the idler gear.

To achieve the above objects, there is also provided an idler device for a magnetic recording/reproducing apparatus including: a rotational central shaft vertically coupled to a main chassis; and an idler arm having an mounting portion elastically engaged to the rotational central shaft in a snap method at the side of the rotational central shaft and an idler gear installed at the opposite of the mounting portion, for selectively transmitting a driving force according to a rotational direction.

In the idler device for a magnetic recording/reproducing apparatus of the present invention, the rotational central shaft is a clutch shaft and press-fit to a fixing hole of the main chassis and fixed in a riveting method.

In the idler device for a magnetic recording/reproducing apparatus of the present invention, the rotational central shaft includes a supporting portion formed at its circumferential surface, and the mounting portion of the idler arm is supported by being coupled between the main chassis and the supporting portion of the rotational central shaft.

In the idler device for a magnetic recording/reproducing apparatus of the present invention, the supporting portion of the rotational central shaft is annularly protruded from the circumference of the rotational central shaft.

In the idler device for a magnetic recording/reproducing apparatus of the present invention, the mounting portion of the idler arm includes a shaft insertion portion with one side opened so that the rotational central shaft can be inserted thereinto and a separation preventing unit formed at the opening portion of the shaft insertion portion, for not allowing separation from the rotational central shaft.

In the idler device for a magnetic recording/reproducing apparatus of the present invention, the separation preventing unit is elastic legs elastically protruded in the direction of the shaft insertion portion from the opened portion of the mounting portion.

In the idler device for a magnetic recording/reproducing apparatus of the present invention, a front end portion the elastic legs contacts the circumferential face of the rotational central shaft and the space between each elastic leg is smaller than the diameter of the rotational central shaft.

In the idler device for a magnetic recording/reproducing apparatus of the present invention, the shaft insertion portion is provided with a semicircular hitching portion closely attached to the rotational central shaft at the portion facing the elastic leg.

To achieve the above objects, there is also provided an idler device of a magnetic recording/reproducing apparatus including: an idler arm installed rotatable centering around a rotational shaft of which one side is fixed at a main chassis; an idler shaft provided at the other side of the idler arm; an idler gear rotatably installed at the idler arm centering around the idler shaft, for selectively transferring a driving force in the rotational direction; and a pressing elastic member supported by the end portion of the idler shaft and elastically pressing the idler gear in the direction of the idler arm.

In the idler device for a magnetic recording/reproducing apparatus of the present invention, the idler arm and the idler shaft are integrally formed.

In the idler device for a magnetic recording/reproducing apparatus of the present invention, a protrusion bar is formed at the end portion of the idler shaft, at which the pressing elastic member is installed and supported.

In the idler device for a magnetic recording/reproducing apparatus of the present invention, the pressing elastic member is formed as a disk type plate spring.

In the idler device for a magnetic recording/reproducing apparatus of the present invention, the pressing elastic member includes a central plate inserted into and supported by the idler shaft, a pressing ring closely attached to the idler gear, and elastic legs connecting the central plate and the pressing ring and having an elastic force.

In the idler device for a magnetic recording/reproducing apparatus of the present invention, the central plate has stoppers protruded so as for the central plate to be coupled and supported at the both sides of the idler shaft.

In the idler device for a magnetic recording/reproducing apparatus of the present invention, the elastic legs are extended to have a scroll structure at the circumference of the central plate.

In the idler device for a magnetic recording/reproducing apparatus of the present invention, the elastic legs are slantingly connected so as for the central plate and the pressing ring to have a predetermined height difference.

With the idler device for a magnetic recording/reproducing apparatus of the present invention, since the idler arm can be snap-engaged to the clutch shaft and the plate spring is fixed to the idler shaft in a state that the idler gear is inserted into the idler shaft of the idler arm, a workability of the assembly working can be improved and the parts can be simplified in number. Thus, a production unit cost can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of an idler device of a magnetic recording/reproducing apparatus in accordance with the present invention, of which a preferred embodiment will now be described.

Figure 1:
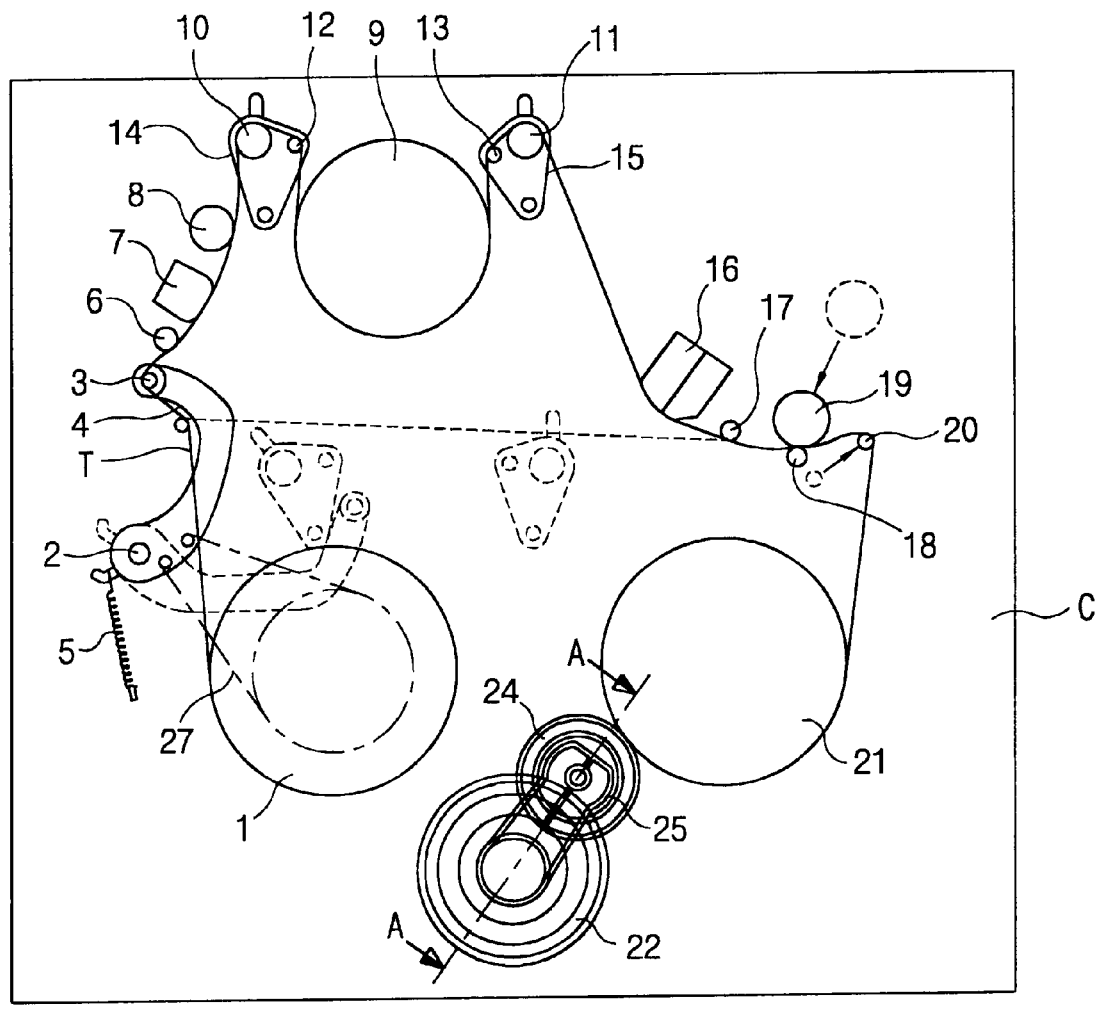
FIG. 1 is a plan view showing a tape traveling structure of a general magnetic recording/reproducing apparatus.
Figure 2:
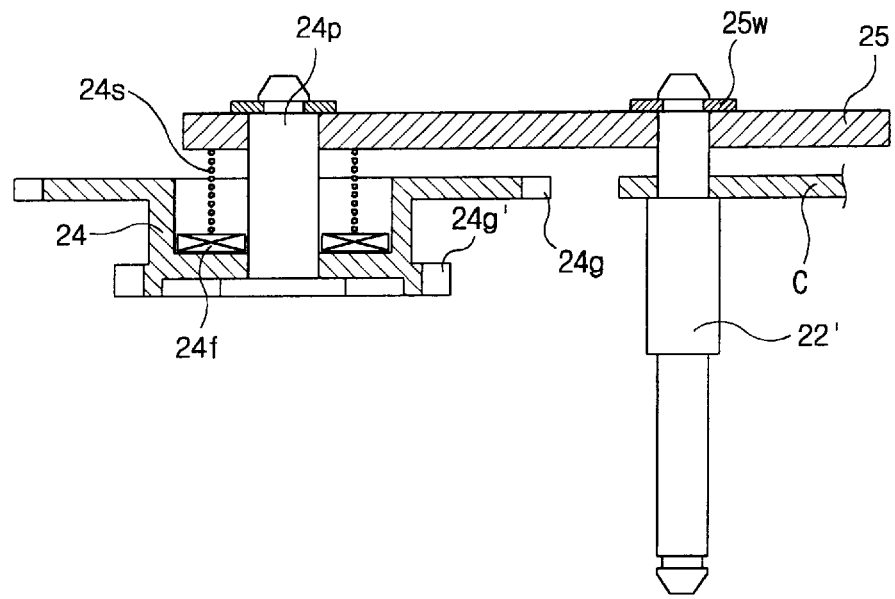
FIG. 2 is a sectional view taken along line 'A—A' of FIG. 1 showing an idler device of a magnetic recording/reproducing apparatus in accordance with a conventional art.
Figure 3:
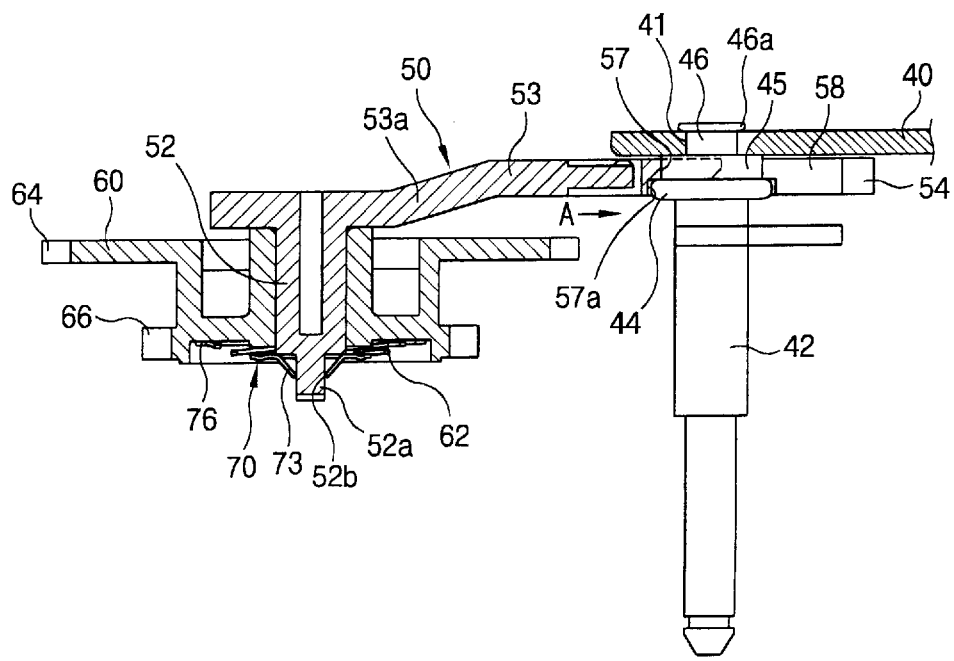
FIG. 3 is a sectional view showing the construction of an idler device of a magnetic recording/reproducing apparatus in accordance with a preferred embodiment of the present invention.

FIG. 3 is a sectional view showing the construction of an idler device of a magnetic recording/reproducing apparatus in accordance with a preferred embodiment of the present invention.

As shown in FIG. 3, a clutch shaft 42 of a clutch assembly is installed downwardly extended at a lower surface of a main chassis 40.

A supporting portion 44 is formed at the lower end of the clutch shaft 42, that is, at a position adjacent to the lower surface of the main chassis 40.

The supporting portion 44 is formed to be annularly protruded having a diameter larger than that of other portions of the clutch shaft 42, so as to support an idler arm 50.

A journal portion 45 is formed at an upper portion of the support portion 44 of the clutch shaft 42, to which the idler arm 50 is closely attached.

A fixed portion 46 is formed at an upper portion of the journal portion 45, press-fit to a fixing hole 41 of the main chassis 40.

The upper portion 46a of the fixed portion 46 is press-fit to the fixing hole 41 of the main chassis 40 and fixed to the main chassis 40 in a riveting method.

The idler arm 50 is integrally formed with the idler shaft 52, and an idler gear 60 is installed at the idler shaft 52. The front end of the idler gear is rotated at a certain angle centering around the clutch shaft 42 in the rotational direction of the idler gear, so that the idler gear 60 can selectively transfer a driving force to the supply reel or the driving reel.

Figure 4:
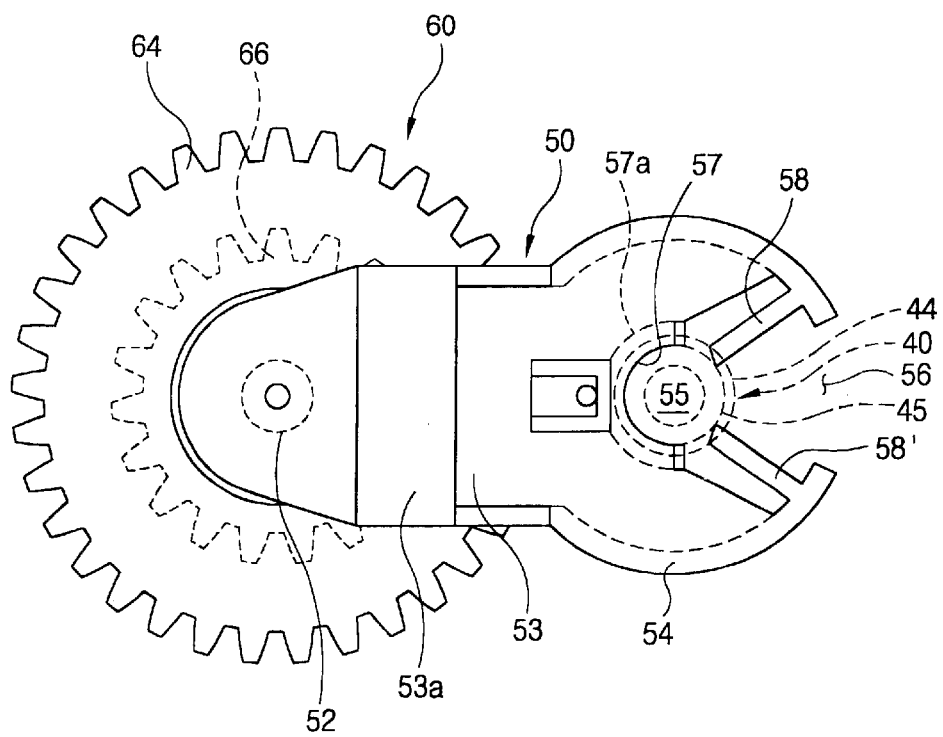
FIG. 4 is a plan view of the idler device in accordance with the preferred embodiment of the present invention.

In order to install the idler arm 50 to the clutch shaft 42, with reference to FIG. 4, a mounting portion 54 is formed at one side of the idler arm 50.

A shaft insertion portion 55 is formed at the center of the mounting portion, into which the clutch shaft 42 is inserted.

A hitching portion 57 is formed at a rear portion of the shaft insertion portion 55 and hitched by the supporting portion 44. The hitching portion 57 has a semicircular structure as shown in FIG. 4 and an extended portion 57a is formed at the lower side thereof, where the support portion of the clutch shaft 42 is positioned.

A front side of the shaft inserting portion 55 is opened where an opening portion 56 is formed allowing an insertion in the side direction of the clutch shaft 42.

Elastic legs 58 and 58', a separation preventing unit, are formed long extended toward the center of the shaft inserting portion 55 from the both ends of the opening portion 56.

The space between the front ends of the elastic legs 58 and 58' is formed to be smaller than the diameter of the clutch shaft 42. The elastic legs 58 and 58' support the outer surface of the journal portion 45 of the clutch shaft 42 so that the clutch shaft 42 may not be arbitrarily released from the shaft inserting portion 55.

An idler shaft 52 is formed integrally connected through the mounting portion 54 and the connecting portion 53 at the other end of the idler arm 50. The connecting portion 53 has a double-bent slant portion 53a.

In the preferred embodiment, the idler shaft 52 is integrally formed with the idler arm 50, but not necessarily limited thereto so long as it is fixed to the idler arm 50.

A protrusion bar 52a is formed at a front end of the idler shaft 52, having a relatively smaller diameter in the axial direction.

The idler gear 60 is installed rotatable centering around the idler shaft 52 of the idler arm 50.

The idler gear 60 renders the idler arm 50 to be rotated centering around the clutch shaft 42 according to its rotational direction.

At the idler gear 50, a pressed face 62 is formed in a ring shape at a lower surface (in view of the drawing), in which the pressing ring 76 of the plate spring 70 (to be described) is mounted.

The idler arm 50 includes a large gear 64 and a small gear 66 for transferring a driving force.

The plate spring 70, the pressing elastic member, is used so that the idler gear can be elastically pressed by the idler arm 50 and thus the idler arm 50 can be rotated in the rotational direction of the idler gear 60.

Figure 5:
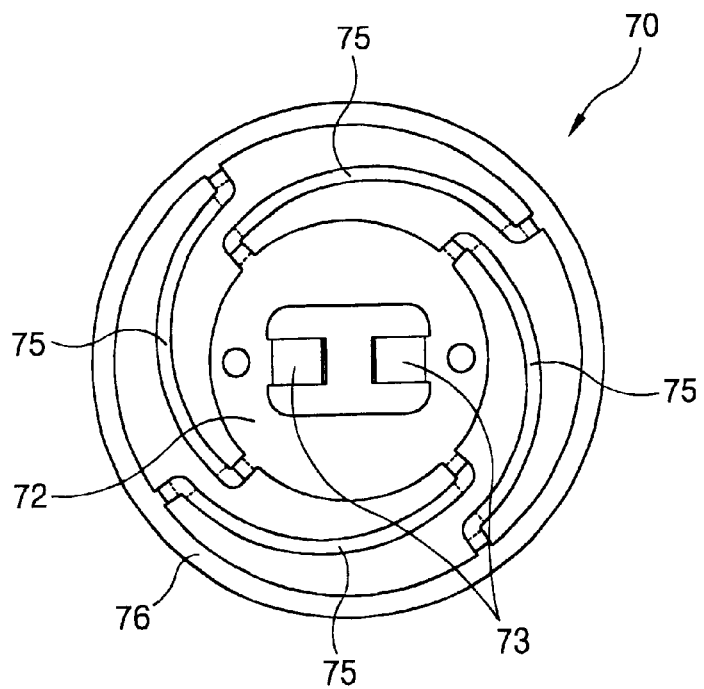
FIG. 5 is a plan view showing the construction of a plate spring in accordance with the preferred embodiment of the present invention.
Figure 6:
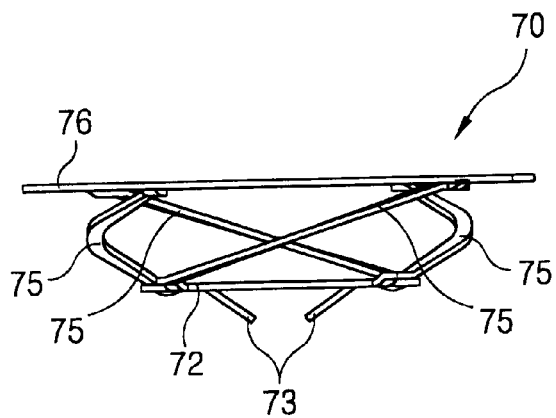
FIG. 6 is a side view showing the construction of the plate spring in accordance with the preferred embodiment of the present invention.

As shown in FIGS. 5 and 6, the plate spring 70 includes a disk-type central plate 72 at the center thereof.

The central plate 72 is for a connection with the protrusion bar 52a and includes stoppers 73 at the inner side. The stoppers 73, which is slantingly bent by cutting the central plate 72 so as to face each other, is installed at the side of the protrusion bar 52a. The protrusion bar 52a may have a groove 52b for inserting the stopper 73.

At the circumference of the central plate 72, a plurality of elastic legs 75 are formed in a scroll structure. The elastic leg 75 has an elastic force in view of its material and shape characteristics, and the pressing ring 76 is connected to its front end portion.

The pressing ring 76 is annularly formed and mounted in the pressed face 62 of the idler gear 60. Since the elastic legs 75 are slantingly formed, the pressing ring 76 has a certain height difference with the central plate 72.

The operation of the idler device for a magnetic recording/reproducing apparatus constructed as described above will now be explained.

First, the idler arm 50 is fixed at the clutch shaft 42. That is, the clutch shaft 42 of the clutch assembly is installed protruded at the lower surface of the main chassis 40.

At this time, the fixed portion 46 of the clutch shaft 42 is press-fit to the fixing hole 41 of the main chassis 40 and then the upper portion is pressed in a rivet method, so that the clutch shaft 42 is firmly fixed at the main chassis 40.

Next, the idler arm 50 is inserted at the lower end of the clutch shaft which is installed at the lower face of the main chassis 40. AT this time, the idler arm 50 is inserted into the clutch shaft 42 from the side of the clutch shaft 42 in the direction of the arrow 'A' of FIG. 3.

That is, the idler arm 50 is positioned at the lower surface of the main chassis 40, and the opening portion 56 of the mounting portion 54 is inserted between the support portion 44 of the lower end of the clutch shaft 42 and the main chassis 40. Then, the clutch shaft 42 is inserted into the shaft inserting portion 55 through the opening portion 56.

At this time, the front ends of the elastic legs 58 and 58' are elastically transformed in the direction of being opened to each other by the clutch shaft 42.

When the clutch shaft 42 is completely inserted into the shaft inserting portion 55, the elastic legs 58 and 58' are restored, so that the elastic legs 58 and 58' and the hitching portion 57 support the outer surface of the clutch shaft 42.

The hitching portion 57a of the idler arm 50 is hitched by the support portion 44, so that the idler arm 50 does not move along the clutch shaft 42.

Installation of the idler gear 60 at the idler arm 50 will now be described.

First, the idler gear 60 is inserted into the idler shaft 52. The central plate 72 of the plate spring 70 is pressed down at the protrusion bar 52a of the idler shaft 52, so that the stopper 73 can be inserted at the both sides of the outer circumference (or the groove) of the protrusion bar 52a.

Then, the pressing ring 76 is mounted in the pressed face 62 of the idler gear 60, so that the idler gear 60 can be pressed to the idler arm 50 with an elastic force. At this time, the elastic force is provided by the elastic leg 74 of the plate spring 70.

The idler gear 60 installed in this manner is rotated upon receiving the driving force provided from the capstan motor. At this time, the idler arm 50 is rotated according to the rotational direction of the idler gear 60. This rotation is made because the idler gear 60 is pressed to the idler arm 50 by the elastic force of the plate spring 70.

As so far described, the idler device of the magnetic recording/reproducing apparatus of the present invention, with the construction that the idler arm is inserted to the side of the clutch shaft which is installed at the lower surface of the main chassis, has many advantages.

That is, for example, first, without an extra construction for assembly, a snap engagement is possibly made, so that a workability of the assembly working is improved and the number of parts can be reduced, and thus, a production cost can be reduced.

Secondly, the assembly of the idler gear is completed as the plate spring is fixed to the idler shaft in a state that the idler gear is inserted in the idler shaft of the idler arm. Thus, the assembly working is relatively facilitated, and a production cost can be reduced with the simple construction.

Lastly, since the plate spring is installed in a state of being fixed at the protrusion bar by the stopper, the relative position of the plate spring is precisely set with respect to the neighboring parts, so that an operation reliability can be remarkably improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An idler device for a magnetic recording/reproducing apparatus comprising:

a clutch shaft coupled to a main chassis;

an idler arm containing one end portion rotatably centered around the clutch shaft by a mounting portion which is elastically engaged to the side of the clutch shaft;

an idler shaft provided at the other end portion of the idler arm;

an idler gear rotatably disposed around the idler shaft for selectively transmitting a driving force according to a rotational direction; and a pressing elastic member mounted at a lower side of the idler gear and fixed to an end portion of the idler shaft, for elastically pressing the idler gear in the direction of the idler arm wherein the pressing elastic member comprises;

a central plate inserted into and supported by the idler shaft;

a pressing ring closely attached to the idler gear; and elastic legs connecting the central plate and the pressing ring and having an elastic force.

2. The device of claim 1, wherein the clutch shaft is provided with a supporting portion at its side, and the mounting portion of the idler arm is supported by being coupled between the main chassis and the supporting portion of the clutch shaft.

3. The device of claim 1, wherein a protrusion portion is formed at the end portion of the idler shaft to support the pressing elastic member, and the pressing elastic member is supported by the protrusion portion and made of a disk-shaped plate spring providing an elastic force to the idler gear.

4. An idler device for a magnetic recording/reproducing apparatus comprising:
   a rotational central shaft vertically coupled to a main chassis; and
   an idler arm integrally formed with a mounting portion elastically engaged to the rotational central shaft in a snap method at the side of the rotational central shaft; and
   an idler gear rotatably disposed with the idler arm, for selectively transmitting a driving force according to a rotational direction.

5. The device of claim 4, wherein the rotational central shaft is a clutch shaft.

6. The device of claim 4, wherein the rotational central shaft is press-fit to a fixing hole of the main chassis and fixed in a riveting method.

7. The device of claim 4, wherein the rotational central shaft includes a supporting portion formed at its circumferential face, and the mounting portion of the idler arm is supported by being coupled between the main chassis and the supporting portion of the rotational central shaft.

8. The device of claim 7, wherein the supporting portion of the rotational central shaft is annularly protruded from the circumference of the rotational central shaft.

9. The device of claim 4, wherein the mounting portion of the idler arm includes a shaft insertion portion with one side opened so that the rotational central shaft can be inserted thereinto and a separation preventing unit formed at the opening portion of the shaft insertion portion, for not allowing separation from the rotational central shaft.

10. The device of claim 9, wherein the separation preventing unit is elastic legs elastically protruded in the direction of the shaft insertion portion from the opened portion of the mounting portion.

11. The device of claim 10, wherein a front end portion the elastic legs contacts the circumferential face of the rotational central shaft and the space between each elastic leg is smaller than the diameter of the rotational central shaft.

12. The device of claim 10, wherein the shaft insertion portion is provided with a semicircular hitching portion closely attached to the rotational central shaft at the portion facing the elastic leg.

13. An idler device of a magnetic recording/reproducing apparatus comprising:
   an idler arm containing one end portion rotatably centered around a rotational shaft of which one side is fixed at a main chassis;
   an idler shaft provided at the other side of the idler arm;
   an idler gear rotatably disposed around the idler shaft for selectively transferring a driving force in the rotational direction; and
   a pressing elastic member mounted at a lower side of the idler gear and fixed to an end portion of the idler shaft and elastically pressing the idler gear in the direction of the idler arm, wherein the pressing elastic member comprises;
   a central plate inserted into and supported by the idler shaft;
   a pressing ring closely attached to the idler gear; and
   elastic lees connecting the central plate and the pressing ring and having an elastic force.

14. The device of claim 13, wherein the idler arm and the idler shaft are integrally formed.

15. The device of claim 13, wherein a protrusion portion is formed at the end portion of the idler shaft, at which the pressing elastic member is installed and supported.

16. The device of claim 13, wherein the pressing elastic member is formed as a disk-type plate spring.

17. The device of claim 13, wherein the central plate has stoppers protruded so as for the central plate to be coupled and supported at the both sides of the idler shaft.

18. The device of claim 13, wherein the elastic legs are extended to have a scroll structure at the circumference of the central plate.

19. The device of claim 13, wherein the elastic legs are slantingly connected so as for the central plate and the pressing ring to have a predetermined height difference.

* * * * *